United States Patent [19]
Yano et al.

[11] Patent Number: 5,247,369
[45] Date of Patent: Sep. 21, 1993

[54] IMAGE TRANSMISSION SYSTEM

[75] Inventors: Koji Yano, Yokohama; Atsushi Nakamura, Tokyo, both of Japan

[73] Assignee: Matsushita Electric Industrial Co., Ltd., Osaka, Japan

[21] Appl. No.: 863,221

[22] Filed: Apr. 3, 1992

[30] Foreign Application Priority Data

Apr. 12, 1991 [JP] Japan .................... 3-079588

[51] Int. Cl.[5] .......................... H04N 1/41
[52] U.S. Cl. ..................... 358/426; 358/438
[58] Field of Search ........... 358/438, 444, 426, 434, 358/443, 209, 909, 479

[56] References Cited

U.S. PATENT DOCUMENTS 4,827,349  5/1989  Ogata et al. .................. 358/438

FOREIGN PATENT DOCUMENTS 2-33193  7/1990  Japan .

OTHER PUBLICATIONS

Honda, et al, "Still Video Transceiver over the General Telephone Networks", Technical Report of IEICE, vol. 88, No. 197, pp. 27-34, Sep. 22, 1988.

Primary Examiner—Mark R. Powell
Attorney, Agent, or Firm—Stevens, Davis, Miller & Mosher

[57] ABSTRACT

An image transmission system for transmitting image data added with code data is disclosed. The image transmission system of the invention has an image transmission device 11 connected with a portable terminal device 13 and a video floppy disk player 12. An image to be transmitted is selected by controlling the video floppy disk player 12 by a command from the portable terminal device 13, and the image is added with code data of the portable terminal device 13 by the image transmission device 11 and transmitted by the image transmission device 11.

2 Claims, 6 Drawing Sheets

IMAGE TRANSMISSION SYSTEM

BACKGROUND OF THE INVENTION

This invention relates to an image transmission system for transmitting image data added with code data.

For the image transmission systems which can send still images by radio, efforts are now underway to increase the transmission rate and produce an error-free system, as discussed by Toyota Honda, "Still Video Transceiver over the General Telephone Networks", Technical Report of the Institute of Electronics, Information and Communication Engineers, Vol. 88, No. 197, pp. 27-34. FIG. 1 shows the construction of the conventional image transmission system. In FIG. 1, reference numeral 21 denotes an image transmission device, and 22 denotes a video floppy disk player, which is played to transfer still image data recorded on a video floppy disk to the image transmission device 21. Reference numeral 23 denotes an image memory part of the image transmission device 21, and temporarily stores still image data supplied from the video floppy disk player 22.

The operation of the image transmission system arranged as mentioned above will be described with reference to FIGS. 2 and 3. A video disk containing images acquired with an electronic still camera is loaded on the video floppy disk player 22 (steps 91, 92). Then, the operator, while looking at a monitor screen, operates the video floppy disk player 22 to select an image he wishes to transmit (step 93). Now, the image transmission device 21 issues a command that data transmission of the selected image in the video floppy disk player 22 should be started (step 94), and a transmission process of image data is executed (step 95).

Description will be made in detail of the selection process (step 93) of images to be transmitted. Let i denote an image number in the floppy disk, and j denote the total image data amount stored in the image memory part 23. They are initialized to i=1 and j=0 (step 96). A decision is made whether to select an image i (step 97), and if the decision is YES, the process proceeds to step 98, and if the decision is NO, the process moves on to step 104. When an image i is selected at step 97, the image transmission device 21 issues a command that the selected image i should be transferred from the video floppy disk player 22 to the video transmission device 21 (step 98), and image data of the image i is transferred to the video transmission device 21 (step 99). In the image transmission device 21, the image data supplied from the video floppy disk player 22 is data compressed (step 100). At this point, data amount of the compressed image i is added to j, and the resultant j is compared with the memory capacity of the image memory part 23 (step 102). If j is now larger than the memory capacity of the image memory part 23, the process proceeds to step 94, and if j is not larger, the process advances to step 103. When j is smaller than the memory capacity of the image memory part 23, data of the compressed image i is transferred to the image memory 23 (step 103). Then, i is added with 1 (step 104), and the resultant i is compared with the number of frames recorded (step 1050. If i is larger than the number of frames recorded, the process moves on to step 94. If i is not larger, the process goes to step 97 and this process is repeated until the number of frames to be transmitted are stored, thereby the image transmission device gets to a state ready for transmission.

However, a problem with the above-mentioned conventional arrangement is that only video data recorded with an electronic still camera can be transmitted, but it is impossible to transmit code data which includes additional information such as an object of video recording, recording conditions, or messages about the condition of the site.

This disadvantage makes the conventional image transmission system inconvenient for recording the condition of a diameter area with a camera and transmitting information on the disaster along with the images from the site to the central station.

SUMMARY OF THE INVENTION

This invention has been made to solve the above-mentioned problem, and therefore an object of the invention is to provide an image transmission system which can transmit image data combined with other information.

In order to achieve the above object, the image transmission system according to the present invention is designed such that a portable terminal device and a video floppy disk player are connected to an image transmission device, and that an image to be transmitted is selected by controlling the video floppy disk player by a command from the portable terminal device for inputting commands and data, and the image is transmitted along with code data generated at the portable terminal device.

By the arrangement mentioned above, this invention makes it possible to transmit image data added with code data by combining image data of an electronic still camera with code data of the portable terminal device.

DESCRIPTION OF THE PREFERRED EMBODIMENTS

Figure 1:
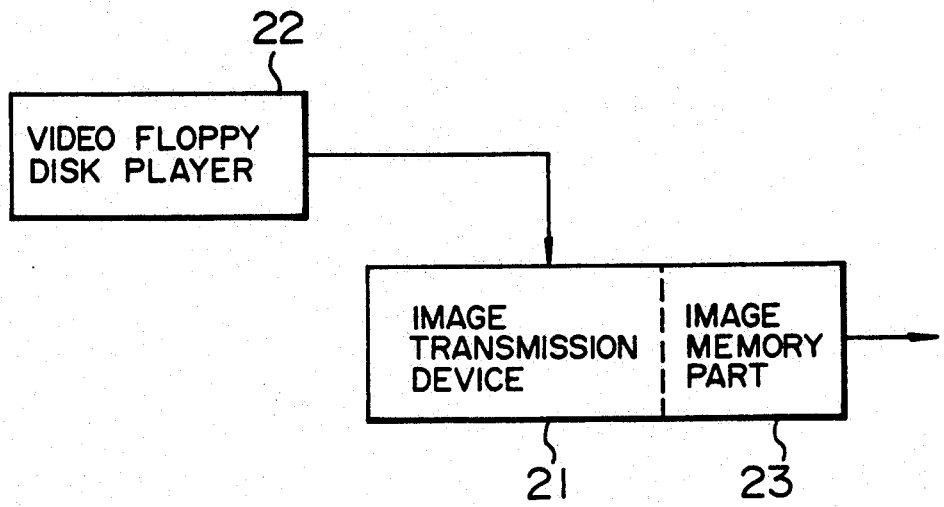
FIG. 1 is a schematic block diagram of the conventional image transmission system.
Figure 2:
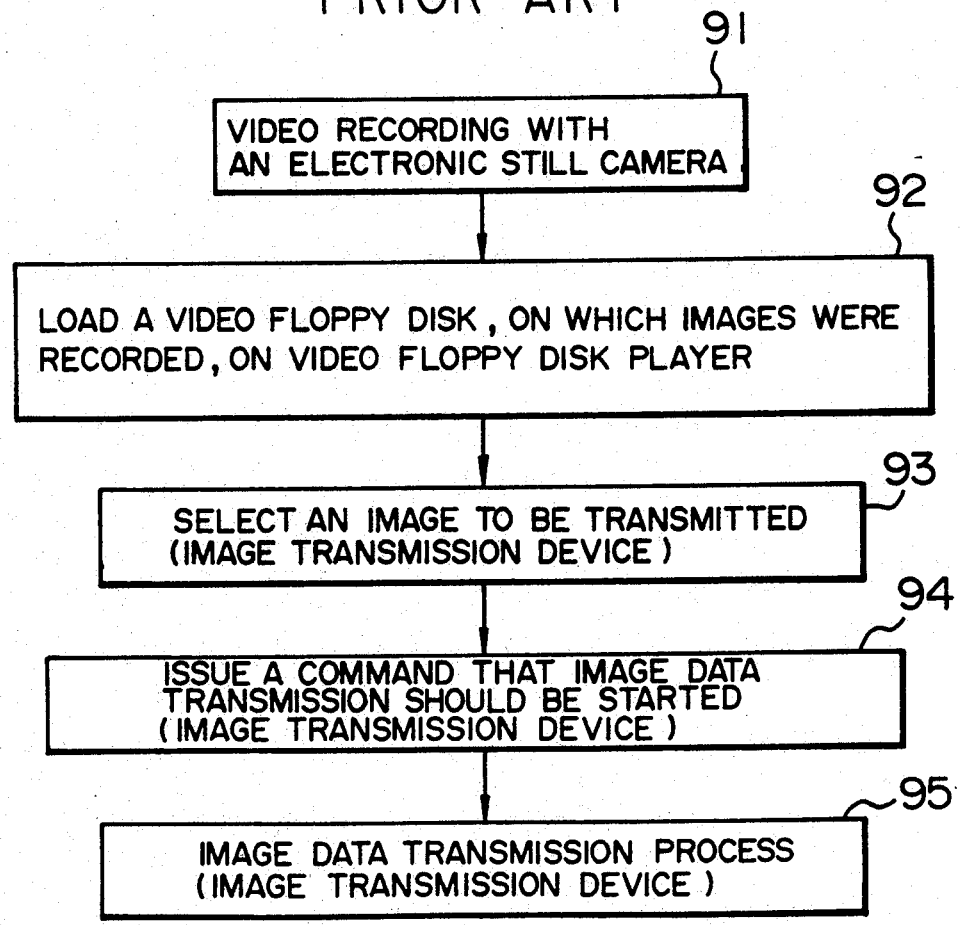
FIG. 2 is a flowchart of the operation of the conventional image transmission system.
Figure 3:
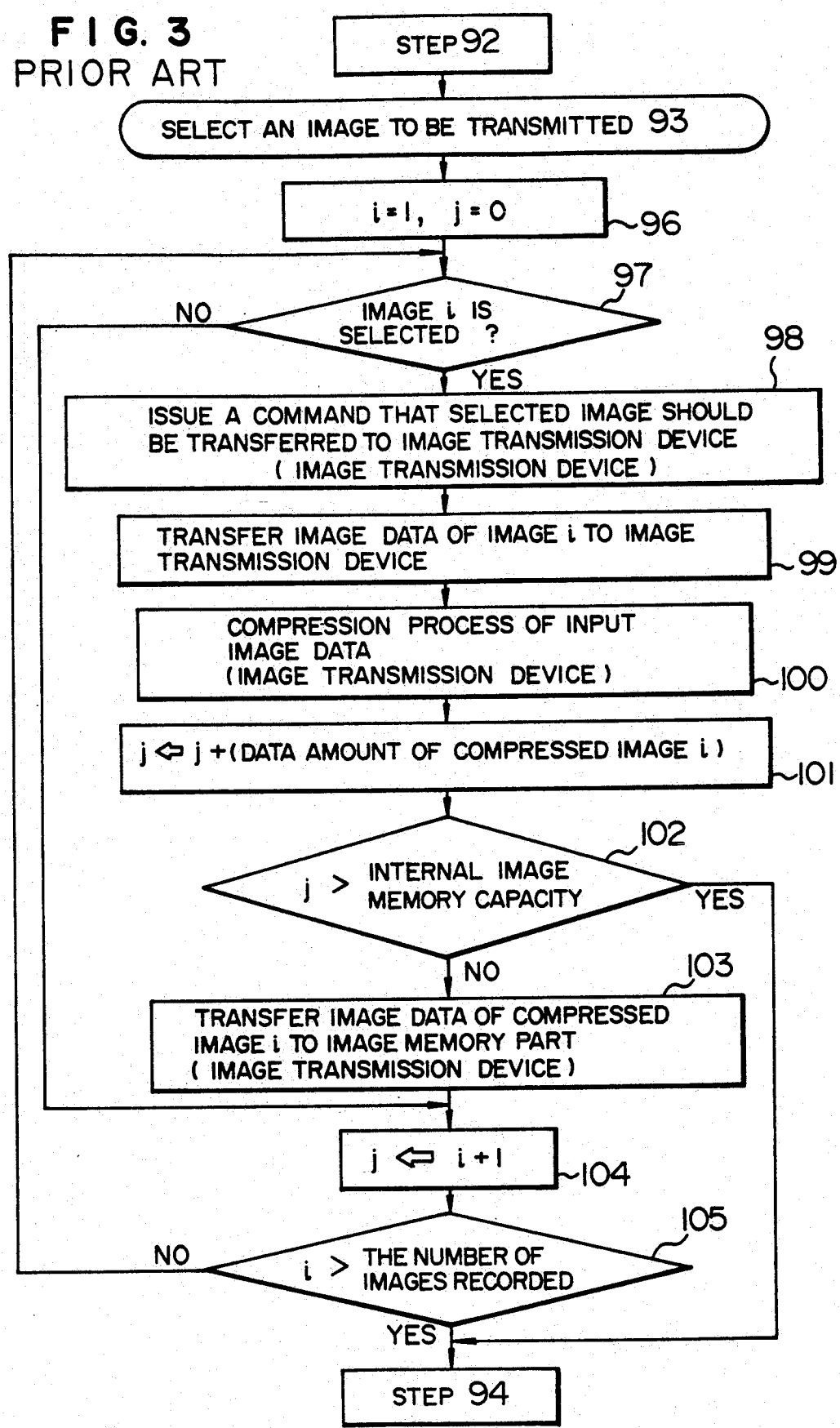
FIG. 3 is a flowchart of a process, which uses the conventional image transmission system, for selecting an image to be transmitted.
Figure 4:
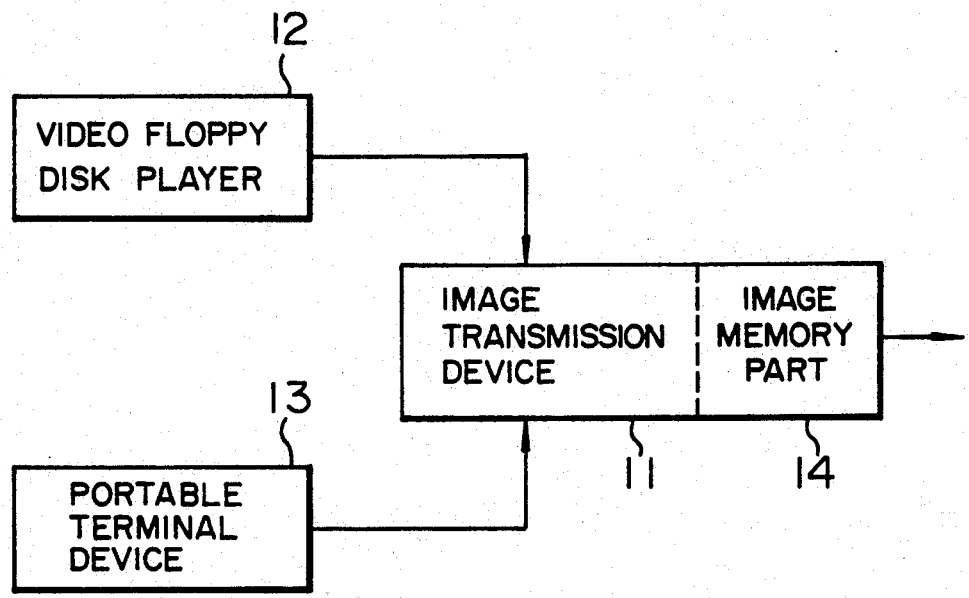
FIG. 4 is a schematic block diagram of the image transmission system according to an embodiment of the present invention.

An embodiment of the present invention will be described with reference to FIG. 4. In FIG. 4, reference numeral 11 denotes an image transmission device, 12 denotes a video floppy disk player, 13 denotes a portable terminal device, and 14 denotes an image memory part of the image transmission device 11. The video floppy disk player 12 and the portable terminal device 13 are connected to the image transmission device 11.

Figure 5:
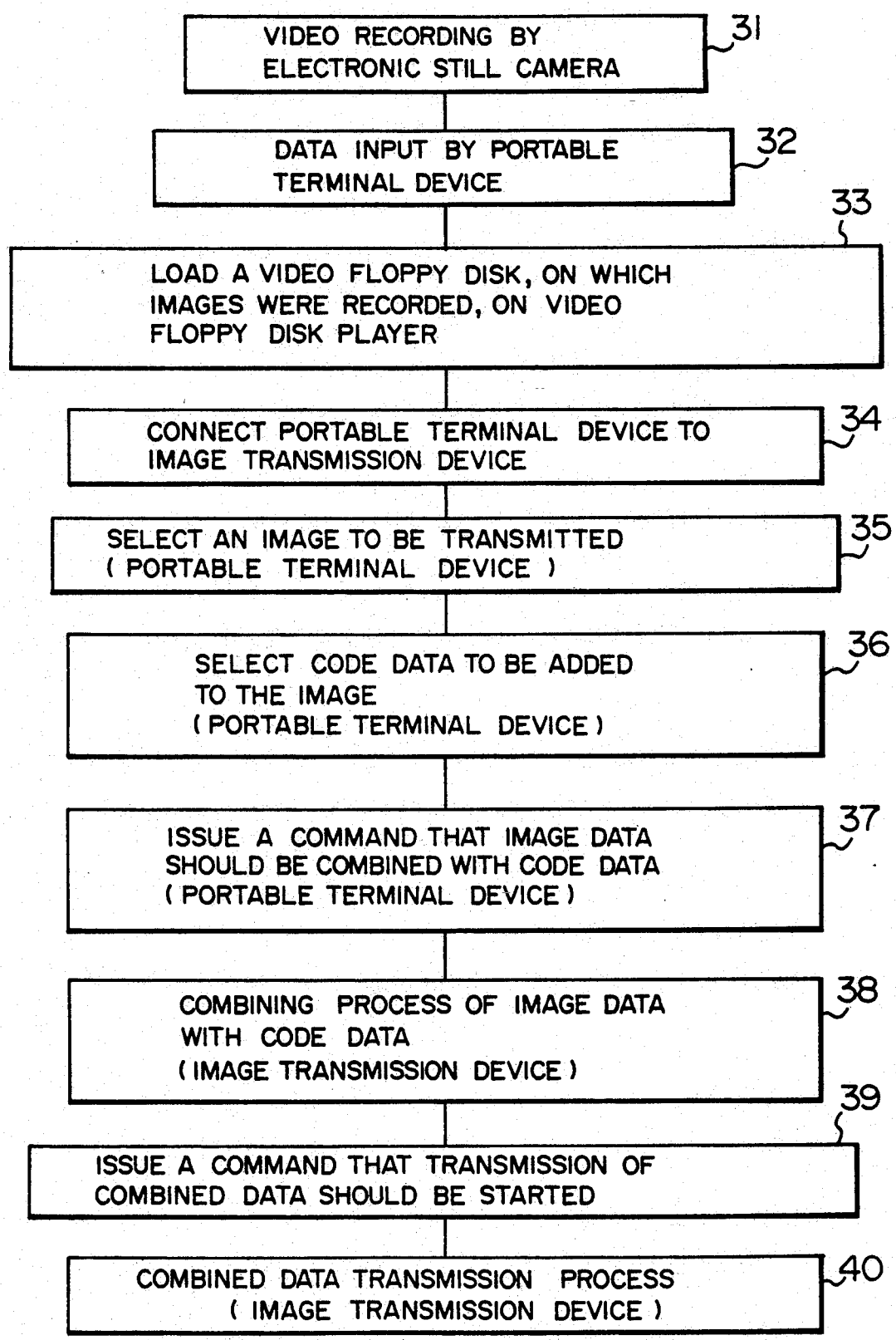
FIG. 5 is a flowchart of a process of combining image data with code data in the above embodiment.

The operation of the thus arranged image transmission system will be described with reference to FIGS. 5 and 6. Image data acquired with the electronic still camera is recorded on a video floppy disk (step 31).

During or after video recording, the portable terminal device receives information to be transmitted along with an image, converts this information into code data and stores the code data in its memory part (step 32). This series of steps may be carried out at each place or each object for video-recording, such as a collapsed bridge or a damaged embankment on patrol.

Figure 6:
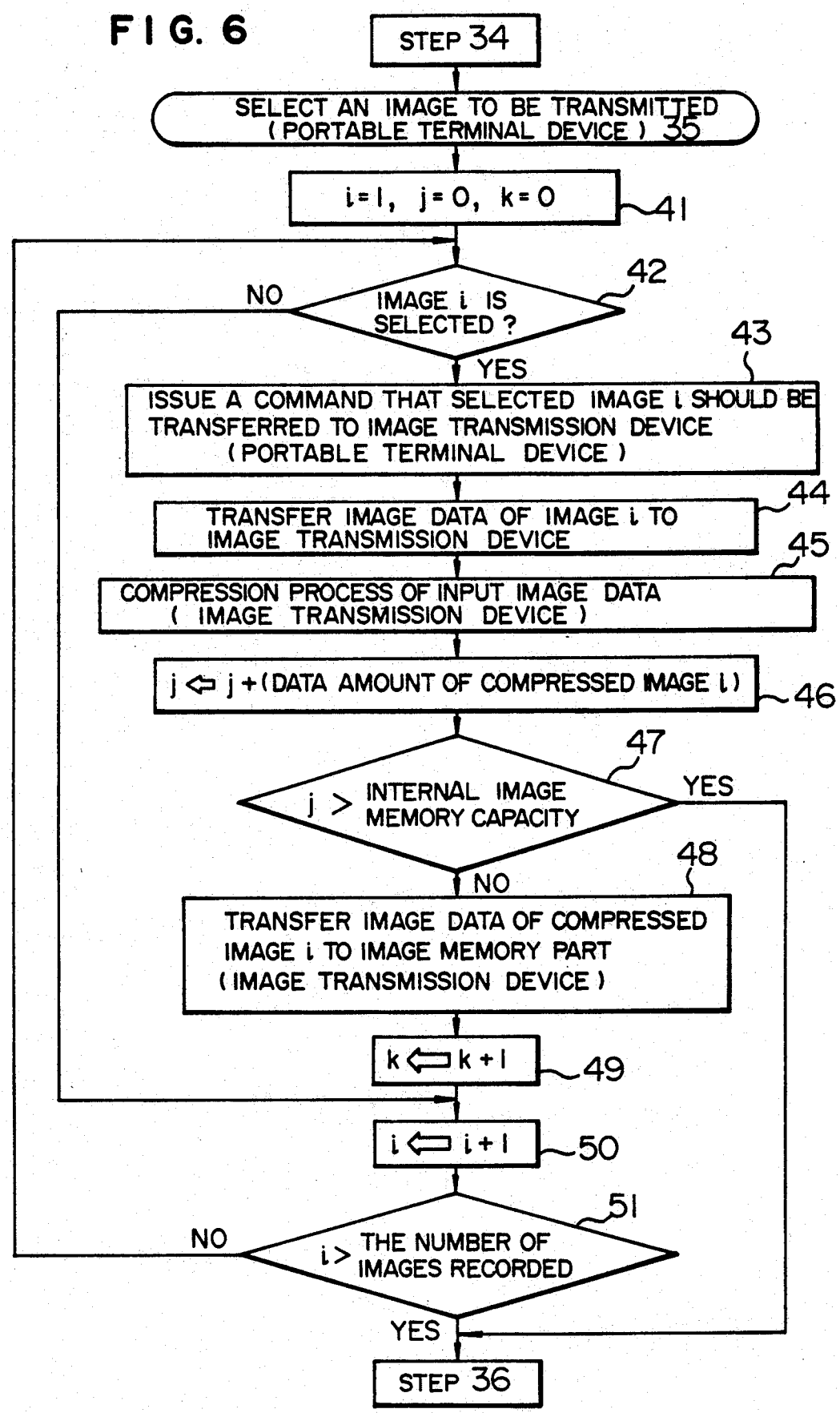
FIG. 6 is a flowchart of a process of selecting an image to be transmitted in the above embodiment.

Referring to FIG. 6, description will be made of the process of selecting an image to be transmitted in response to a command from the portable terminal device 13 (step 35). Let i be an image number in the floppy disk, j be the total image data amount stored in the image memory part 14, and k be the number of image data compressed for transmission. They are initialized to i=1, j=0, and k=0 (step 41). A decision is made whether to select an image i (step 42), and if the decision is YES, the process advances to step 43, and if the decision is NO, the process moves on to step 50. When the image i is selected at step 42, the portable terminal device 13 gives a command to the image transmission device 11 that the selected image i should be transferred from the video floppy disk player 12 to the image transmission device 11 (step 43). Whereupon, the image data of the image i is transferred to the image transmission device 11 (step 44). In the image transmission device 11, the image data supplied from the video floppy disk player 12 is compressed (step 45). At this point, the image data amount of the compressed image i is added to j (step 46), and the resultant j is compared with the memory capacity of the image memory part 14 (step 47). If j is larger than the memory capacity of the image memory part 14, the process proceeds to step 36, because the image memory part 14 cannot store more information than its capacity, and if j is not larger, the process moves on to step 48. When j is found to be smaller than the memory capacity of the image memory part 14, image data of the compressed image i is transferred to the image memory part 14 (step 48), and k is added with 1 (step 49). Next, i is added with 1 (step 50), the resultant i is compared with the number of images recorded (step 51), and when i is greater than the number of images acquired, because this means that all image data to be transmitted has been transmitted, the process proceeds to step 36, and if i is not larger, the process moves on to step 42. This series of steps is repeated until the number of images to be transmitted are stored.

When images to be transmitted have been selected, at step 36, code data of the portable terminal device 13 to be added to the images is selected. Then, the portable terminal device 13 gives a command that the image data stored in the image memory part 14 should be combined with the code data of the portable terminal device 13 selected at step 36 (step 37). Thus, in the image transmission device 11, the image data stored in the image memory part 14 is combined with code data from the portable terminal device 13 according to a data format shown in FIG. 7 (step 38), by which the combined data is put in a condition ready for transmission. On receiving a command to start combined-data transmission from the portable terminal device 13 (step 39), the image transmission device 11 executes a process of transmitting the image data (step 40).

Description will now be made of the process of combining image data with code data in step 38 mentioned in the description of the embodiment and also the data format of the combining process.

Figure 7:
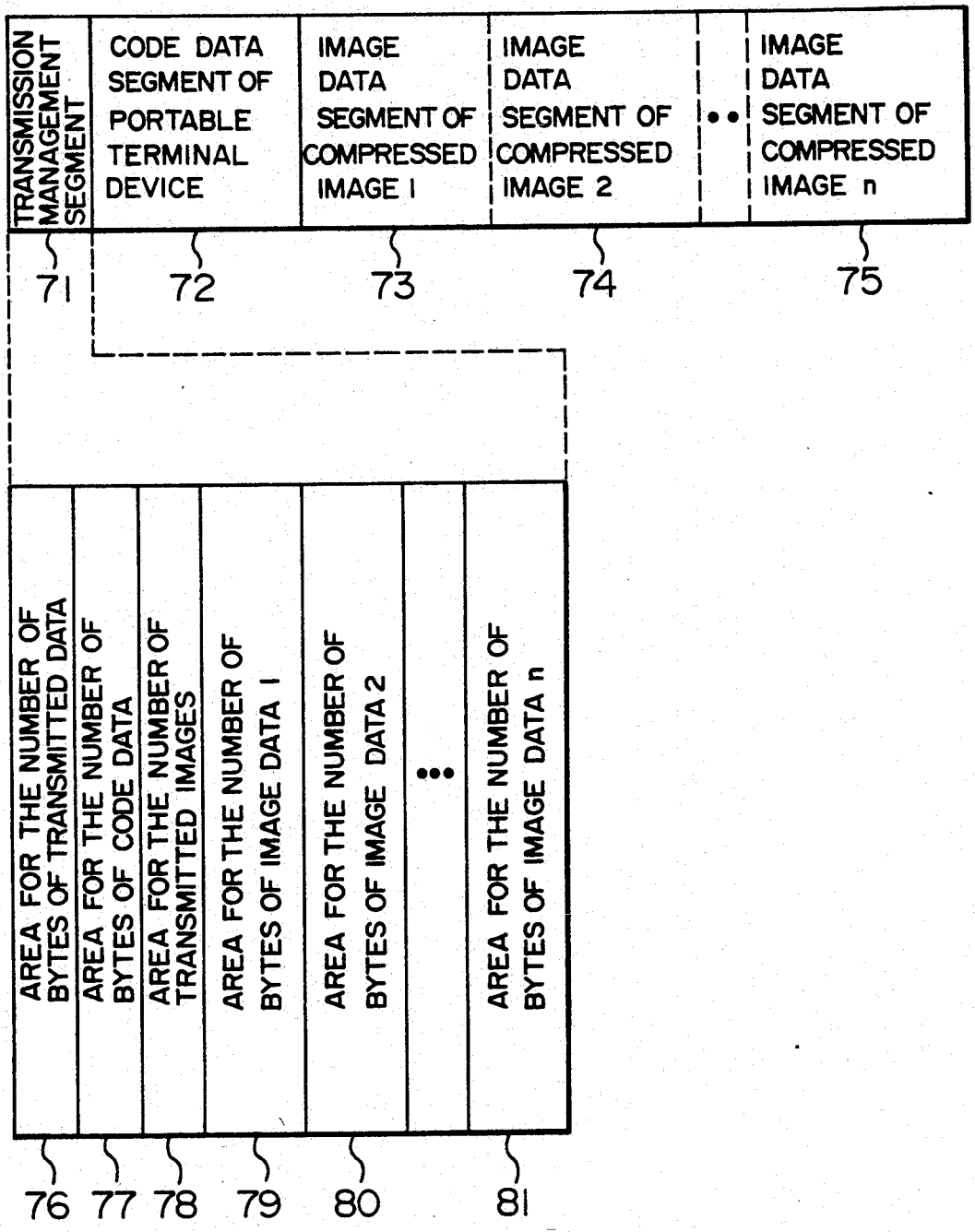
FIG. 7 is a data format for combining image data with code data in the above embodiment.

As shown in FIG. 7, combined data of image data and code data comprises a transmission management segment 71, including an area 76 for storing the total number of bytes of transmitted data, an area 77 for storing the number of bytes of code data, an area 78 for storing the number of transmitted images, an area 79 for storing the number of bytes of a compressed image 1, an area 80 for storing the number of bytes of data of a compressed image 2, and an area 81 for storing the number of bytes of data of a compressed image n; a code data segment 72 of the portable terminal device; an image data segment 73 of the compressed image 1; an image data segment 74 of the compressed image 2; and an image data segment 75 of the compressed image n.

At step 45 (FIG. 6), if k=0 the data amount of compressed image i is stored in "the area 79 for the number of bytes of compressed image data 1", if k=1, the data amount of the compressed image i is stored in "the area 80 for the number of bytes of compressed image data 2", or if k=n, the data amount of the compressed image i is stored in "the area 81 for the number of bytes of compressed image data n". And, at step 48 (FIG. 6), if k=0, the image data of the compressed image i is stored in "the image data segment 73 of the compressed image 1", if k=1, the image data of the compressed image i is stored in "the image data segment 74 of the compressed image 2" or if k=n, the image data of the compressed image i is stored in "the image data segment 75 of the compressed image n". In addition, the code data of the portable terminal device 13 selected at step 36 (FIG. 5) is stored in "the code data segment 72 of the portable terminal device" at step 37, and the number of bytes of code data of the portable terminal device 13 selected at step 36 is stored in "the area 77 for the number of bytes of code data". Finally, the value of k just before the advance to step 36 is stored in "the area 78 for the number of transmitted images", and the total number of bytes of transmitted data is stored in "the area 76 for the number of bytes of transmitted data".

After the combined-data transmission process (step 40), a process of dividing into image data and code data at the receiving station can be performed by referring to the transmission management segment 71.

As has been described, according to the above embodiment, it is possible to transmit image data added with code data by combining code data of the portable terminal device 13 and image data of the electronic still camera, read from the video floppy disk player 12, by a command from the portable terminal device 13.

At the receiving station, it is possible to look at image data and code data shown together by reproducing those data at the same time.

What is claimed is:

1. An image transmission system comprising:
   a portable terminal device capable of inputting code data;
   a player means for generating image data comprising at least one image by playing a video floppy disk on which a video recording was stored with an electronic still camera;
   an image transmission device for combining and transmitting code data of said portable terminal device and image data from said player in accordance with a command from said portable terminal device,
   said image transmission device including:

selecting means for selecting only image data designated by said portable terminal device to be transmitted by said image transmission device, designating means having a transmitting image number area for storing a number of images to be transmitted, and at least one image data byte area for storing a number of bytes required for storing an image to be transmitted and for designating said number of images to be transmitted and said number of bytes corresponding to the image data to be transmitted, prior to transmission of said image data.

2. An image transmission system according to claim 1, wherein said selecting means includes an image memory, and said selecting means compresses image data to be transmitted which is designated among stored image data by said portable terminal device, and accumulates compressed image data in said image, memory, such that when the accumulated compressed image data is larger than the capacity of said image memory, said selecting means ceases accumulating said compressed image data and causes the image transmission device to transmit the image data.

* * * * *